(12) United States Patent
Nakagawa et al.

(10) Patent No.: US 6,393,818 B1
(45) Date of Patent: May 28, 2002

(54) ROLLED PRODUCT FOR CHAIN AND METHOD FOR PRODUCING SAME

(75) Inventors: Takerou Nakagawa; Sachihiko Maeda; Atsuhiro Tamiya; Takeshi Kimura; Takeshi Kondo, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/837,973

(22) Filed: Apr. 19, 2001

(30) Foreign Application Priority Data

Apr. 20, 2000 (JP) .................................. 2000-119815

(51) Int. Cl.$^7$ .............................. B21L 9/02; F16G 13/06
(52) U.S. Cl. .............................. 59/4; 59/35.1; 29/898.1; 384/283; 384/291
(58) Field of Search ............................ 59/4, 5, 7, 35.1; 29/898.1, 898.054, 898.056, 898.057; 384/283, 284, 291

(56) References Cited

U.S. PATENT DOCUMENTS

| | | | |
|---|---|---|---|
| 1,581,394 A | * | 4/1926 | Dann .................. 384/284 |
| 1,597,428 A | * | 8/1926 | Brincil ............... 384/284 |
| 2,615,768 A | * | 10/1952 | Schluchter .......... 384/284 |
| 5,697,206 A | | 12/1997 | Otani |

FOREIGN PATENT DOCUMENTS

| | | |
|---|---|---|
| EP | 0 119 898 A1 | 9/1983 |
| GB | 0552235 A | 3/1943 |
| GB | 2 297 818 A | 8/1996 |
| JP | 2963652 B2 | 10/1996 |
| JP | 08277886 A | 10/1996 |

* cited by examiner

Primary Examiner—David Jones
(74) Attorney, Agent, or Firm—Howson & Howson

(57) ABSTRACT

A rolled product for a chain and a method for producing the rolled product are disclosed. Plural dimples are formed in a zigzag pattern in at least one of inner and outer peripheral surfaces of the rolled product, the dimples absorbing plastic deformation of a rolled workpiece when the rolled product is forced through a circular orifice of a die, and plural recessed portions are defined by the dimples on any imaginary straight line on the dimpled surface in the axial direction of the rolled product. The absorption of plastic flow by the dimples prevents a waving phenomenon from occurring at the end faces of the rolled product. When the rolled product is used as a chain component such as bushing or roller, it is possible to prevent leakage of a lubricant in the axial direction of the rolled product, and hence possible to improve the lubricant retaining performance in a rotating and sliding portion.

5 Claims, 8 Drawing Sheets

ROLLED PRODUCT FOR CHAIN AND METHOD FOR PRODUCING SAME

FIELD OF THE INVENTION

The present invention relates to a rolled product suitable for use in a chain as a hollow cylindrical component, such as a bushing which is press-fit at opposite ends into [an] the inner plates of the chain, a roller fit on the bushing, or a bushing fitted in the roller. This invention also relates to a method for producing such rolled product.

BACKGROUND OF THE INVENTION

FIG. 14 hereof shows in exploded perspective view a typical chain of the type concerned. The chain comprises inner plates L1, outer plates L2, bushings B press-fit into the inner plates L1, connector pins P press-fit into the outer plates L2 and extending through the bushings B, and rollers R which are fitted on the bushings B between opposed inner plates L1. A lubricant is present between each connector pin P and each bushing B or between each bushing B and each roller R to facilitate sliding.

The cylindrical bushings B and rollers R are each in many cases produced by rolling a rectangular workpiece by means of a forming machine or the like, the rectangular workpiece being obtained by cutting a steel strip. In Japanese Patent No. 2963652 there is disclosed a method of producing the bushing B by rolling. According to the disclosed method, a rectangular workpiece is rolled into a cylindrical shape and the cylindrically rolled product is then forced through the circular orifice or opening of a die for improving the accuracy of its various dimensional properties, including circularity.

More particularly, a rolled product is produced in the following manner. As shown in FIG. 10, a plurality of elongated grooves 33 extending in the transverse direction of a steel strip 32 are formed in the surface of the steel strip. Since the grooves 33 are closed at opposite ends and do not extend through the thickness of the steel strip 33, they are hereinafter referred to as "blind" grooves. The steel strip 32 is then subjected to drawing and subsequently cut into a rectangular workpiece 34. The workpiece 34 is then rolled so that the cut faces become opposed to each other, to afford a cylindrical product 35, as shown in FIG. 11. Then, a core or mandrel 36 is inserted into the cylindrical product 35, and while keeping this condition, the cylindrical product 35 is forced through the circular orifice or opening of a die 37, as shown in FIG. 12. The steel strip 32 is drawn before being cut into rectangular workpieces 34 to obtain a predetermined target plate thickness and width and sectional shape defining the blind grooves.

In the case where the blind grooves are arranged differently from the arrangement shown in FIG. 10 hereof, for example, in a zigzag pattern, transversely interrupted pattern or diagonal pattern, such as shown in FIGS. 10, 11 and 12, respectively, of Japanese Patent No. 2963652, the distribution density of the blind grooves becomes uneven in the longitudinal and transverse directions of the steel strip. For the unevenly arranged blind grooves, if the depth of the bind grooves is made large, there arises the problem that the steel strip may be broken or raptured when subjected to drawing through a die.

In producing the rolled product 31 in the above manner, when the cylindrical product 35 is forced through the circular orifice of the die 37 for obtaining circularity, plastic flow occurs in the material of the cylindrical product 35. Since this plastic flow is concentrated at the blind grooves, it has so far not been considered that any large axial dimensional change would occur in the rolled product 31. However, when the cylindrical product 35 is forced through the circular orifice of the die 37, there sometimes occurs a case where the plastic flow of the material cannot be sufficiently absorbed by the blind grooves 33 even though no large change occurs in the axial dimension of the rolled product 31. In this case, as shown in FIG. 13, which is a developed plan view of the rolled product 31, a slight plastic deformation occurs axially and a portion 31A of the end face along imaginary straight line Y1—Y1, where there is a blind groove 33, and a portion 31B of the end face along imaginary straight line Y2—Y2, where there is no blind groove 33, are slightly concave and convex, respectively. As a result, a wave-like phenomenon is seen in the end faces of the rolled product when viewed as a whole. For example, when the rolled product 31 is used as a bushing B and both of its ends are press-fit into inner plates L1 of the chain, variations occur in the degree of fit when the chain is checked as a whole, and there is a deterioration in the dimensional accuracy between inner plates L1. Also in the case in which the rolled product 31 is used as a roller, its end faces undergo a deterioration of dimensional accuracy due to the waving phenomenon.

Moreover, when the rolled product 31 is used as the bushing B or the roller R in the chain, a lubricant such as lubricating oil is retained in the blind grooves 33 in the rotating and sliding portion between the connector pin P and the bushing B or between the bushing B and the roller R to prevent sliding friction. However, since the blind grooves 33 extend axially of the rolled product, once the lubricant leaks from terminal ends 33A, it leaks to the exterior from end faces of the rolled product 31, thus giving rise to the problem that satisfactory lubricating performance cannot be ensured over a long period of time.

Further, since the blind grooves are not uniformly formed axially and circumferentially of an inner peripheral surface of the rolled product, there has been the problem that the compressive strength in the axial or circumferential direction of the rolled product varies, being different at different positions on the circumference.

SUMMARY OF THE INVENTION

Accordingly, it is an object of the invention to solve the above-mentioned problems of the prior art and provide a rolled product for a chain capable of preventing a steel strip used as a blank material from being broken or ruptured during drawing thereof, preventing the material of the cylindrical product from undergoing plastic flow partially in its axial direction when the cylindrical product is forced through the circular orifice of a die, and preventing the occurrence of a waving phenomenon at the end faces of the rolled product, and further capable of minimizing the leakage of lubricant in the axial direction of the rolled product and improving the lubricant retaining performance in the rotating and sliding portion. These problems are addressed by arranging depressions or dimples in a zigzag fashion on the steel strip.

Another object of the invention is to provide a method for producing the rolled product.

For achieving the above-mentioned objects, in the first aspect of the invention, a rolled product for a chain is formed by rolling a rectangular workpiece into a cylindrical product and forcing the cylindrical product through a circular orifice of a die, wherein a plurality of dimples are formed zigzag in at least one of inner and outer peripheral surfaces of the rolled product, the dimples being formed for absorbing plastic deformation of the cylindrical product when forced through the circular orifice of the die, and a plurality of recessed portions are defined by the dimples on any imaginary straight line on the dimpled peripheral surface, in the axial direction of the rolled product.

The rolled product may be a bushing adapted to be press-fit at its opposite ends into inner plates of the chain, wherein the dimples are formed in an inner peripheral surface of the bushing. Alternatively, the rolled product may be a roller adapted to be slidably mounted on a bushing of the chain, the bushing being press-fit at its opposite ends into inner plates of the chain, wherein the dimples are formed in an inner peripheral surface of the roller. As a further alternative, the rolled product may comprise a bushing adapted to be press-fit at its opposite ends into inner plates of the chain, and a roller adapted to be slidably mounted on the bushing, wherein the dimples are formed in an inner peripheral surface of the bushing and an inner peripheral surface of the roller. The dimples may be formed also in an outer peripheral surface of the bushing. The rolled product may further be a bushing adapted to be fitted in a roller of the chain and adapted to be slidably mounted on a second bushing press-fit at opposite ends into inner plates of the chain, wherein the dimples are formed in an inner peripheral surface of the first bushing.

In the second aspect of the invention there is provided a method for producing a rolled product for a chain, comprising the steps of: providing a steel strip having a plurality of dimples formed zigzag in at least one of opposite surfaces of the steel strip such that a plurality of recessed portions are defined by the dimples on any imaginary straight line on the dimpled surface or surfaces in the widthwise direction of the steel strip; subjecting the steel strip to a drawing process; cutting the thus-drawn steel strip into a rectangular workpiece; rolling the workpiece into a cylindrical product in such a manner that the cut faces thereof are opposed to each other; and forcing the cylindrical product through a circular orifice of a die thereby to produce a rolled product while allowing plastic deformation of the cylindrical product to be absorbed by the dimples. Preferably, the dimples are formed in the at least one surface of the steel strip so as to leave a dimple-free margin along each longitudinal edge of the steel strip.

The dimples have a generally square rhombic shape, a generally elliptic shape or a generally circular shape.

Since the dimples are formed zigzag in at least one of the inner and outer peripheral surfaces of the rolled product for the purpose of absorbing [a] plastic deformation of the cylindrical product when forced through the circular orifice of the die, and since a plurality of recesses portions are defined by the dimples on any imaginary straight line on the dimpled surface or surfaces in the axial direction of the rolled product, plastic flow of the material is concentrated mainly toward the dimples when the cylindrical product enters the circular orifice of the die and also when it leaves the same die. By allowing such a plastic deformation to be absorbed by specific portions, i.e., dimples, it is possible to eliminate the waving phenomenon at the end faces of the rolled product and hence possible to improve the accuracy of the rolled product. The "dimples" as referred to herein include surface depressions, recesses, and blind holes not extending through the thickness of the rolled product.

When the rolled product is used as a bushing or a roller in a chain, even if the lubricant retained in a dimple leaks in the axial direction of the rolled product, it is prevented from escaping because a large number of protrusions which the leaking lubricant must go over are present between the dimples, and the leaking lubricant gets into an adjacent dimple and is again retained therein. Thus, a high lubricant retaining performance and a satisfactory lubricating performance can be attained. In this case, the dimples which retain the lubricant not only function as pockets for the lubricant, but also function to let the lubricant leak onto the sliding surfaces.

In the case where the rolled product is a bushing having both of its ends press-fit into inner plates of the chain, since the dimples are formed in at least one of the inner and outer peripheral surfaces of the rolled product, the dimples define a large number of pockets for the lubricant between the inner peripheral surface of the bushing and the outer peripheral surface of a connector pin or between the outer peripheral surface of the bushing and the inner peripheral surface of a roller, whereby the lubricant retaining performance is improved.

In the case where the rolled product is a roller fitted on a bushing having both of its ends press-fit into inner plates of the chain, dimples are formed in an inner peripheral surface of the roller, and they define a large number of lubricant pockets between the outer peripheral surface of the bushing and the inner peripheral surface of the roller, whereby the lubricant retaining performance is improved.

In the case where the rolled product is a bushing fitted in a roller, dimples are formed in the inner peripheral surface of the bushing and the bushing-fitted roller slides with respect to a bushing which is press-fit into inner plates of the chain or with respect to a connector pin. In this case, the dimples define a large number of lubricant pockets between the inner peripheral surface of the bushing-fitted roller and the bushing or between the inner peripheral surface of the bushing-fitted roller and the connector pin, whereby the lubricant retaining performance is improved.

According to the method for producing a rolled product for a chain, the rolled product is produced in the following manner. A plurality of dimples are formed zigzag beforehand in at least one of the front and back surfaces of a steel strip so as to leave a margin from each of end portions of the steel strip. The dimples define a plurality of recesses portions on any imaginary straight line on the dimpled surface in the transverse direction of the steel strip. The steel strip is then subjected to drawing and thereafter cut into a rectangular blank. The rectangular blank is then rolled into a cylindrical product by means of a forming machine or the like so that the cut faces are opposed to each other. Then, a core or mandrel is inserted into the cylindrical product, and in this state the cylindrical product is forced through a circular orifice of a die. At this time, a plastic flow occurs in the cylindrical product, but since this plastic flow is concentrated toward the dimples which are formed zigzag, there is scarcely any significant change in the axial dimension of the completed rolled product, nor does any waving phenomenon occur at the end faces of the rolled product.

DETAILED DESCRIPTION OF THE PREFERRED EMBODIMENT

Figure 1:
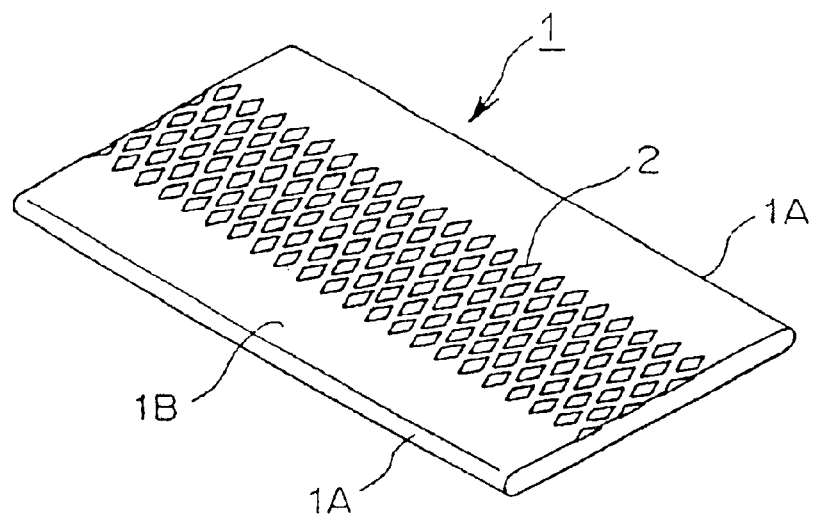
FIG. 1 is a perspective view of a rectangular workpiece used in an embodiment of the invention.
Figure 2:
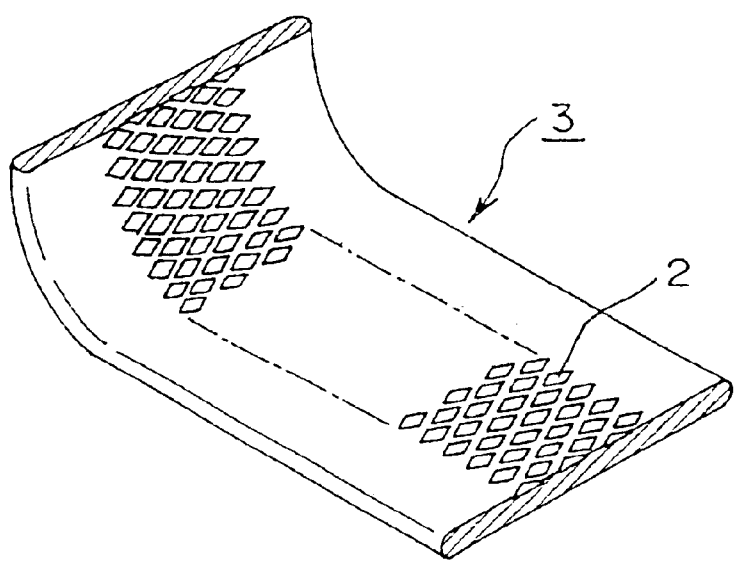
FIG. 2 is a perspective view of a steel strip before being cut into the rectangular workpiece.

An embodiment of the invention will be described hereunder with reference to FIGS. 1 to 8. In the following description, the same parts as in the prior art described above will be designated by the same reference characters as in the prior art.

Figure 3:
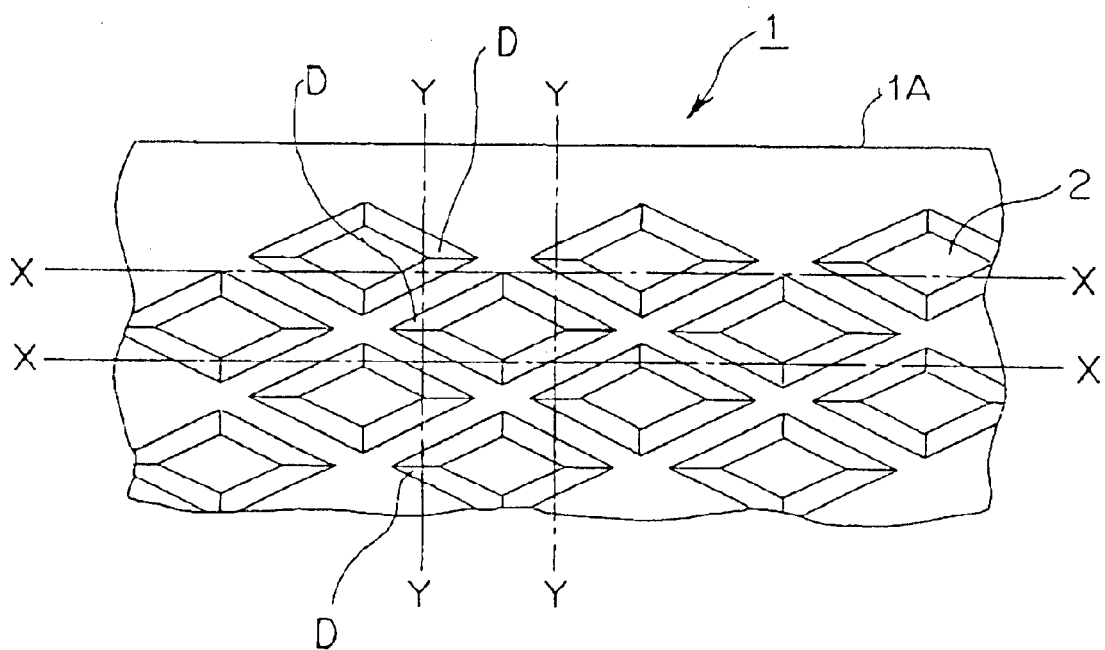
FIG. 3 is an enlarged partial plan view of the rectangular workpiece.

In FIG. 1 there is illustrated a rectangular workpiece 1 from which a rolled product is produced in accordance with the invention. The rectangular workpiece 1 is obtained by first drawing a steel strip 3 (FIG. 2) into predetermined plate thickness, width and sectional shape (formed with surface depression or dimples), the steel strip 3 having a plurality of depressions or dimples 2 formed in its surface and arranged uniformly in a zigzag pattern so as to leave a margin 1B from each longitudinal edge portion 1A. Subsequently, the steel strip 3 is cut into rectangular blanks or workpieces 1 of individual lengths. The terms "dimples are arranged zigzag" means that they are positioned zigzag in the transverse direction of the steel strip 3. As shown in FIG. 3, the dimples 2 are each in a generally square rhombic shape and are each formed as a variant of blind holes D, not through holes. See FIGS. 5 to 8. When the steel strip 3 is subjected to drawing, it will never be broken or ruptured, because the dimples 2 are arranged uniformly in a zigzag pattern.

The dimples 2, thus arranged in a zigzag pattern, define a plurality of recesses portions on any imaginary straight line Y—Y transverse to the workpiece 1, whatever its position may be. For example, in the rectangular workpiece 1 shown in FIG. 3, a plurality of recesses are formed on each of imaginary straight lines Y—Y in the transverse direction. Similarly, between the margins, a plurality of recesses are formed on each of imaginary straight lines X—X, in the longitudinal direction.

Figure 4:
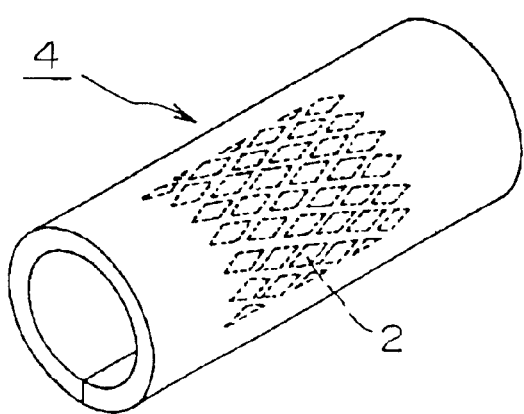
FIG. 4 is a perspective view of a rolled product formed from the rectangular workpiece.
Figure 11:
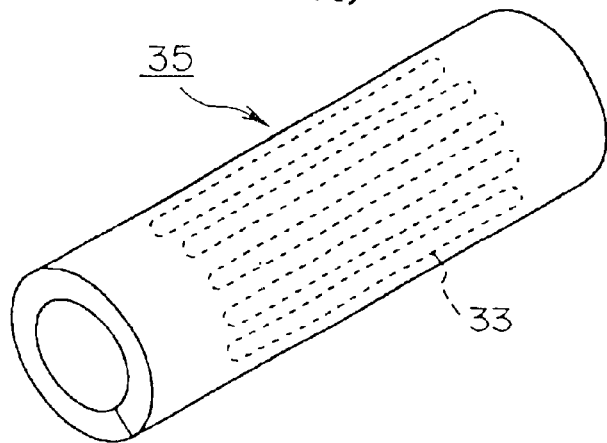
FIG. 11 as a perspective view of a cylindrical product formed from the blank material shown in FIG. 10.
Figure 12:
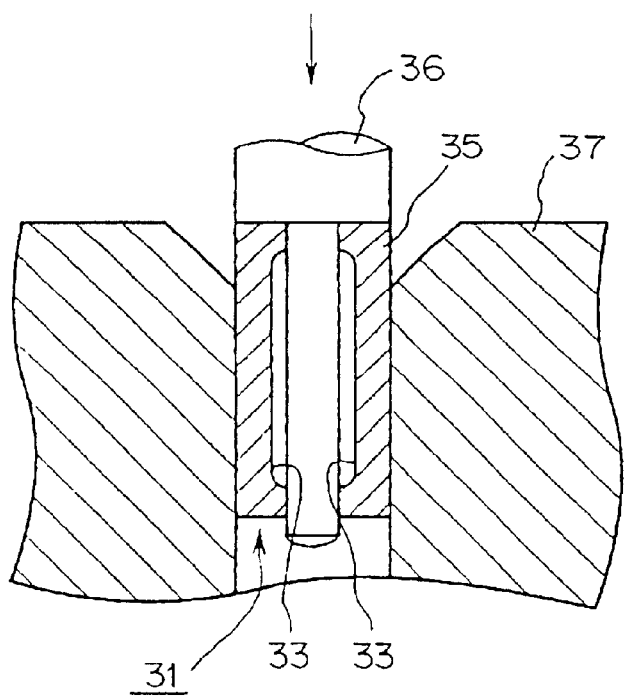
FIG. 12 is a cross-sectional view illustrative of the manner in which the cylindrical product is forced through the circular orifice of a die for attaining circularity to produce a rolled product.

In the same way as in the prior art, the rectangular workpiece 1 is rolled, by means of a forming machine, into a cylindrical product so that the cut faces are opposed to each other, for example as shown in FIG. 11. Then, as in the conventional process for attaining circularity, a core or mandrel 36 is inserted into the cylindrical product, which in turn is forced through the circular orifice or opening of a die 37 (see FIG. 12), to produce a rolled product 4 (FIG. 4).

Figure 13:
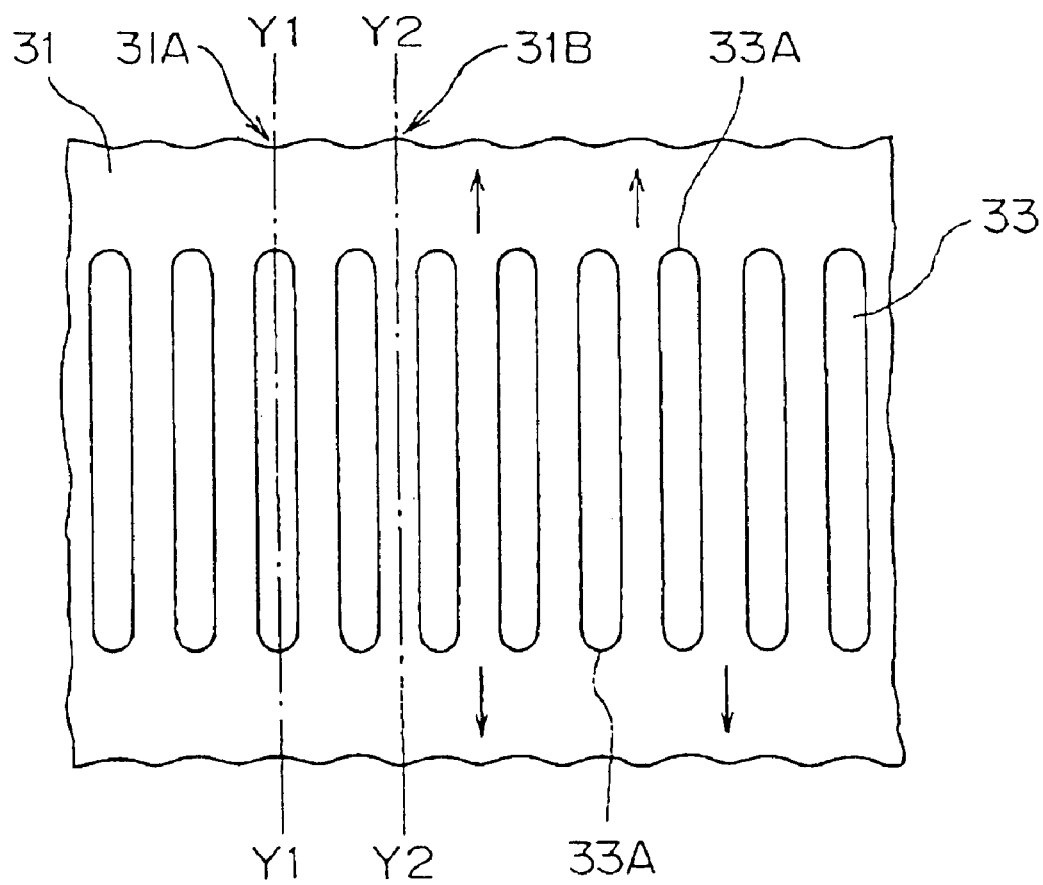
FIG. 13 is a developed plan view of the conventional rolled product.
Figure 14:
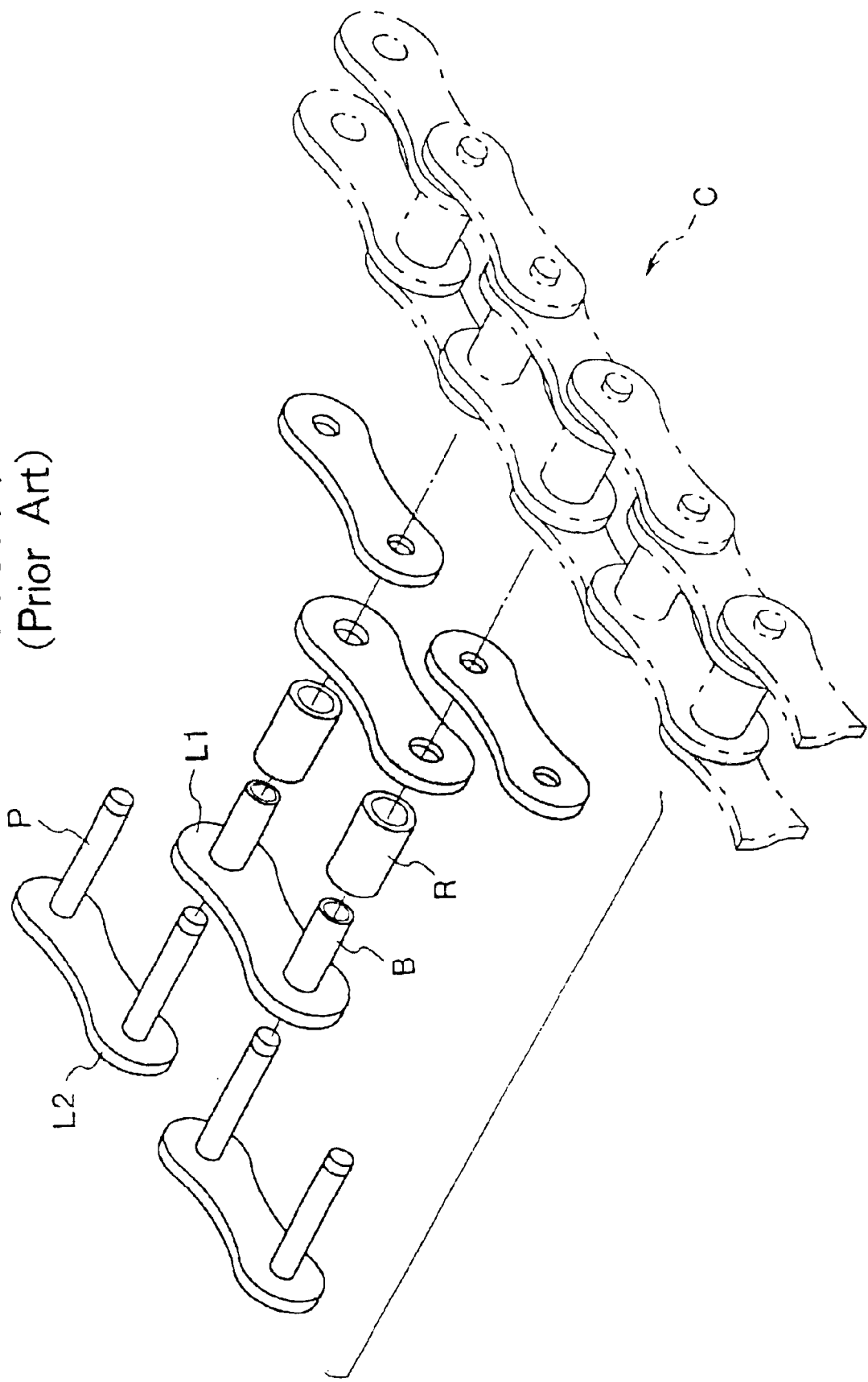
FIG. 14 is an exploded perspective view of a chain which uses a rolled product.

At this time a plastic flow occurs in the material of the cylindrical product. However, since this plastic flow is concentrated toward the zigzag dimples 2, not only is there scarcely any significant change in axial size of the rolled product as a final product, but also it is possible to prevent the occurrence of a waving phenomenon at the end faces of the rolled product (as indicated at 31A and 31B in FIG. 13).

In this case, since the arrangement of the dimples 2 in the rolled product 4 is the same as that existing before the cylindrical product is forced through the circular orifice of the die to produce circularity, the rolled product 4 is provided with plural dimples 2 in a zigzag pattern, and the dimples 2 provide plural recesses portions on any imaginary straight line in the axial direction on the dimpled surface of the rolled product 4. Since the plural recesses portions are thus formed on any imaginary straight line in the axial direction of the rolled product 4, it follows as a corollary, that a plurality of protrusions are formed axially in the undimpled portions of the rolled product.

Consequently, in the case where the rolled product 4 is used as a bushing or a roller in a chain, even if the lubricant retained in a dimple 2 leaks axially of the rolled product, since between the dimples 2 there are many protrusions which the leaking lubricant must go over, the leaking lubricant flows into adjacent dimples 2 and is again retained therein. Thus, the lubricant retaining performance is superior and it is possible to maintain satisfactory lubricating performance over a long period of time.

Although in this embodiment the dimples 2 are formed in the inner peripheral surface of the rolled product 4, it is not necessary that the dimples be limited to the inner surface, as the dimples 2 may be formed in either or both of the inner and outer peripheral surfaces of the rolled product 4. Further, since the dimples 2 are not through holes, but are formed, in a zigzag pattern, as mere surface depressions or recesses, the rolled product is free of variations in strength throughout its circumference. Therefore, when the rolled product 4 is used as a bushing or a roller in a chain, it exhibits sufficient strength in use, so that the strength of the chain can be maintained.

The rolled product 4 is suitable for use as a bushing whose both ends are press-fit into opposed inner plates L1 of a chain, as a roller fitted on the bushing with both ends thereof fitted into the inner plates L1, or as a bushing fitted in the roller. With the rolled product 4, not only can the chain lubricating performance be further improved, but also the service life of the chain can be improved because of the improved lubricating performance.

Figure 5:
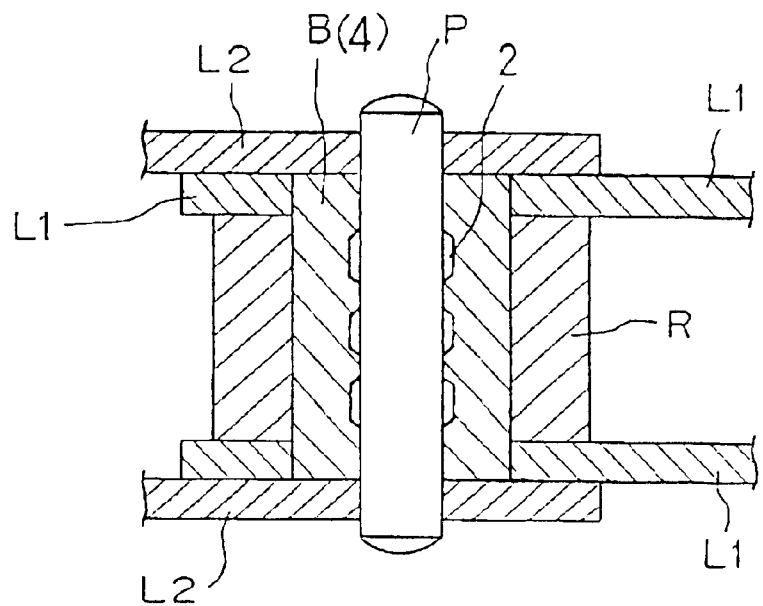
FIG. 5 is a partially sectional view of a chain which uses the rolled product as a bushing.

Application examples of the rolled product 4 as chain components will now be described with reference to FIGS. 5 to 8. In FIG. 5, the rolled product 4 is used as a bushing B of a chain. Dimples 2 are formed in an inner peripheral surface of the bushing B. The bushing B is press-fit at opposite ends into opposed inner plates L1, with which outer plates L2 are combined, and a connector pin P is inserted through the bushing B to constitute a chain. In this case, the bushing B can be reliably fitted into the inner plates L1 because no waving phenomenon occurs at the end faces of the bushing B. Further, a lubricant is retained in the dimples 2 formed in the inner peripheral surface of the bushing B, and, even if the lubricant leaks axially from one dimple 2, it flows into an adjacent dimple and is again retained therein. This ensures that the slide surfaces of the bushing B and the connector pin P can be maintained in a satisfactory lubricated condition over a long period of time.

Figure 6:
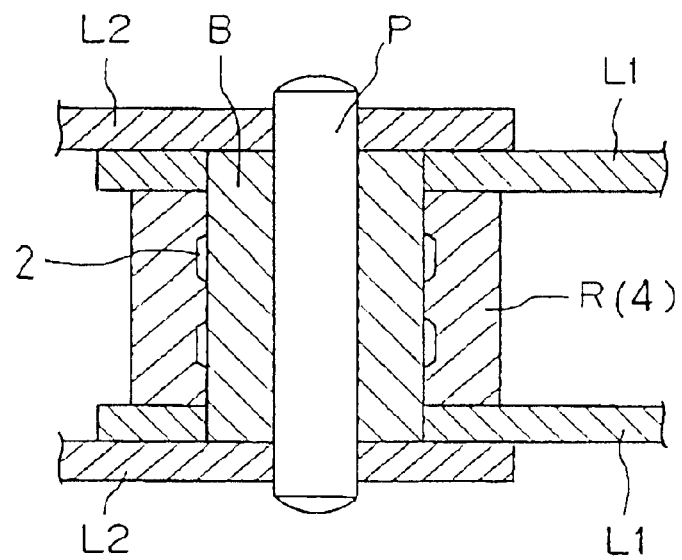
FIG. 6 is a partially sectional view of a chain which uses the rolled product as a roller.

In FIG. 6, the rolled product 4 is used as a roller R. Dimples 2 are formed in an inner peripheral surface of the roller R. A bushing B is press-fit at opposite ends into opposed inner plates L1, and a connector pin P is inserted through the bushing B to constitute a chain. In this case, a sliding surface of the bushing B and the inner peripheral surface, serving as a sliding surface of the roller R, are maintained in a satisfactory lubricated condition over a long period of time because a lubricant is retained in the dimples 2 formed in the inner peripheral surface of the roller R.

Figure 7:
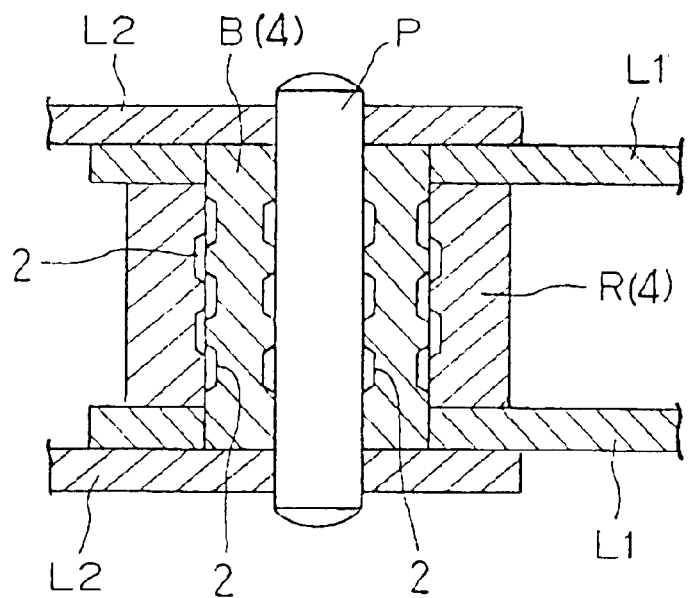
FIG. 7 is a partially sectional view of a chain which uses the rolled product as both a bushing and a roller.

In FIG. 7, the rolled product 4 is used both as a bushing B and as a roller R. Dimples 2 are formed in both inner and outer peripheral surfaces of the bushing B and are also formed in an inner peripheral surface of the roller R. The bushing B is press-fit at opposite ends into opposed inner plates L1, and a pin P is inserted through the bushing B to constitute a chain. In this case, a lubricant is held in the dimples 2 formed in the inner peripheral surface of the bushing B and also in the dimples 2 formed in both the outer peripheral surface of the bushing B and the inner peripheral surface of the roller R. Accordingly, a sliding surface of the connector pin P and the inner peripheral surface of the bushing B, serving as a sliding surface, as well as the outer peripheral surface of the bushing B and the inner peripheral surface of the roller R, both serving as sliding surfaces, can be maintained in a satisfactory lubricated condition over a long period of time.

Figure 8:
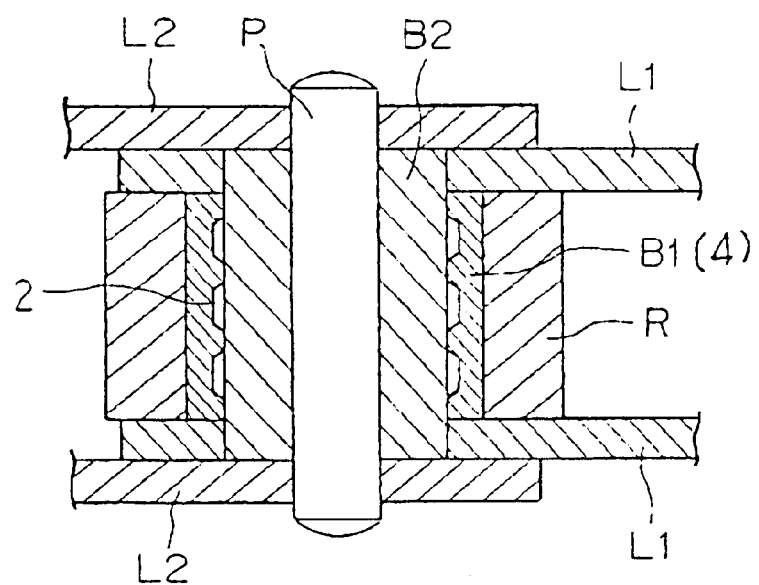
FIG. 8 is a partially sectional view of a chain which uses the rolled product as a bushing fitted in a roller.

In FIG. 8, the rolled product 4 is used as a bushing B1 fitted in a roller R. Dimples 2 are formed in the inner peripheral surface of the bushing B1. The bushing B1, which has been fitted in the roller R and thus rendered integral with the roller, is slidably fitted on a bushing B2 which is then press-fit at its opposite ends into opposed inner plates L1. After outer plates L2 are associated with the inner plates L1, a connector pin P is inserted through the bushing B2 to constitute a chain. In this case, since a lubricant is held in the dimples 2 formed in the inner peripheral surface of the bushing B1, sliding surfaces of the bushings B1 and B2, which are both fitted within the interior of the roller R, can be maintained in a satisfactory lubricated condition over a long period of time.

Figure 9A:
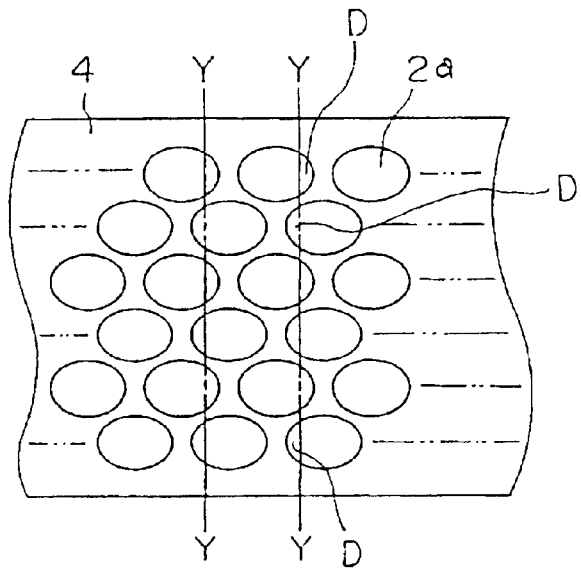
FIGS. 9A and 9B are developed plan views of rolled products, showing modified forms of dimples according to the [present] invention.
Figure 9B:
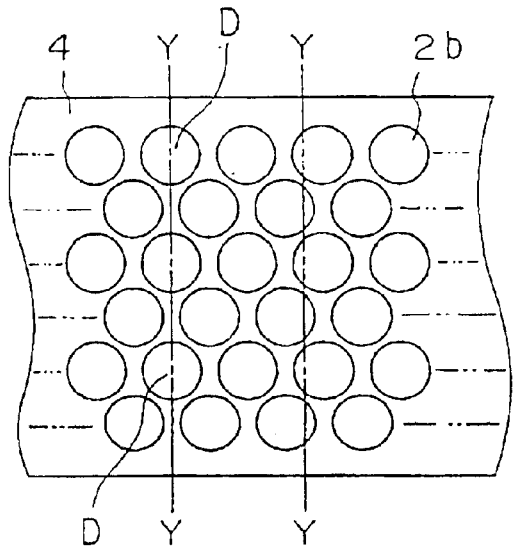
Figure 10:
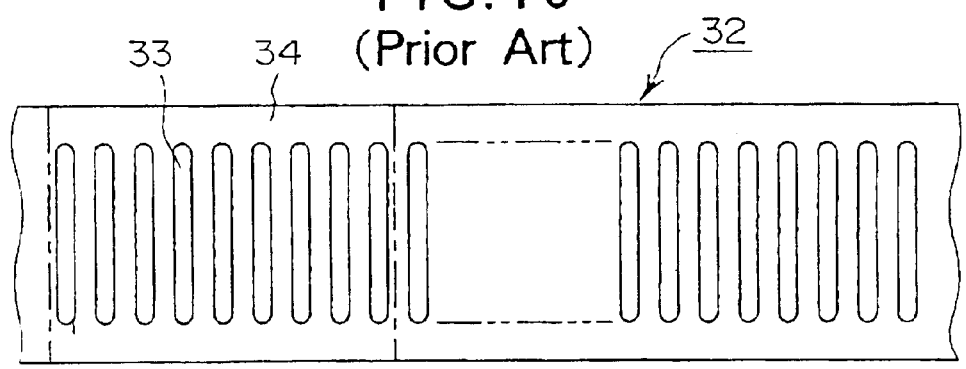
FIG. 10 is a plan view of a steel strip serving as a blank material of a conventional rolled product.

Although in the above embodiments each of the dimples 2 formed in at least one of the inner and outer peripheral surfaces of the rolled product 4 is in a generally square, rhombic shape, there is no particular limitation to the shape of the dimples. For example, the dimples may each be in a generally elliptic shape as designated by 2a in FIG. 9A, a generally circular shape as designated by 2b in FIG. 9B, or a laterally long rectangular shape (not shown). Thus, the dimples may take any shape so long as a plurality of recesses portions is defined by the dimples on any imaginary line in the axial direction on the dimpled surface of the rolled product.

In the rolled product for a chain according to the invention, as set forth above, a plurality of depression or dimples are formed in a zigzag pattern in at least one of the inner and outer peripheral surfaces of the rolled product, and a plurality of recesses portions are defined by the dimples on any virtual straight line on the dimpled surface in the axial direction of the rolled product. Therefore, in the case where the rolled product of the invention is used as a component of a chain, such as a bushing or a roller, even if a lubricant leaks axially from any of the dimples formed in the inner or outer peripheral surface which serves as a sliding surface of the rolled product, many protrusions, which the leaking lubricant must go over, are present between the dimples, and the leaking lubricant flows into an adjacent dimple and is again retained therein. Thus, the dimple pattern exhibits high lubricant retaining performance, and it is possible to maintain satisfactory lubricating performance over a long period of time, leading to an improvement of the chain life.

Further, in the rolled product for a chain according to the invention, since a plurality of dimples is formed in a zigzag pattern in at least one of the inner and outer peripheral surfaces of the cylindrical preform of the rolled product, the dimples absorb plastic deformation of the cylindrical preform when it is forced through the circular orifice of a die. Consequently, plastic flow of the material allowed to occur but is concentrated mainly toward the dimples when the cylindrical product enters the die and also when it leaves the same die. Thus, it is possible to absorb axial plastic deformation, thereby eliminating the waving phenomenon at the end faces of the rolled product and producing a rolled product having superior accuracy in its axial dimension.

Further, when the steel strip used as a workpiece is subjected to drawing in the rolled product manufacturing process, there is no reason to fear that the steel strip will be broken or ruptured, because the dimples are formed in a zigzag pattern.

Various changes and modifications of the invention are possible in the light of the above teaching. It is therefore to be understood that, within the scope of the appended claims, the invention may be practiced otherwise than as specifically described.

What is claimed is:

1. A method for producing a rolled product for a chain, comprising the steps of:

provide a steel strip having a pair of longitudinal edges and opposite surfaces, the longitudinal edges extending in a lengthwise direction, there being a widthwise direction perpendicular to said longitudinal edges, the steel strip so provided also having a plurality of dimples formed in at least one of said opposite surfaces, the dimples being disposed in a pattern such that any imaginary straight line extending widthwise along said one of said opposite surfaces extends over a plurality of said dimples;

subjecting the steel strip to a drawing process;

cutting the thus-drawn steel strip widthwise into a rectangular workpiece;

rolling said workpiece into a cylindrical product in such a manner that the cut faces thereof are opposed to each other; and forcing said cylindrical product through a circular orifice of a die to thereby produce a rolled product while allowing plastic deformation of the cylindrical product to be absorbed by said dimples.

2. A method according to claim 1, wherein said dimples are formed in said at least one surface of the steel strip so as to leave a dimple-free margin along each longitudinal edge of the steel strip.

3. A method according to claim 1, wherein said dimples have a generally square rhombic shape.

4. A method according to claim 1, wherein said dimples have a generally elliptic shape.

5. A method according to claim 1, wherein said dimples have a generally circular shape.

* * * * *

UNITED STATES PATENT AND TRADEMARK OFFICE
CERTIFICATE OF CORRECTION

PATENT NO. : 6,393,818 B1
DATED : May 28, 2002
INVENTOR(S) : Takerou Nakagawa et al.

It is certified that error appears in the above-identified patent and that said Letters Patent is hereby corrected as shown below:

Title page,
Item [57], ABSTRACT,
Line 3, delete the word "zigzag"

Column 1,
Line 7, delete "[an]";
Line 54, change "in a zigzag pattern" to -- in a pattern of long and short grooves, --

Column 2,
Line 57, change "These problems are addressed by arranging depressions or dimples in a zigzag fashion on the steel strip." to -- These problems are addressed by arranging depressions or dimples in a pattern such that any imaginary straight line extending widthwise along one of the dimpled surfaces extends over a plurality of the dimples. --

Column 3,
Lines 30 and 48, delete the word "zigzag"

Column 5,
Line 40, delete the word "zigzag"

Column 6,
Lines 3, 12 and 35, delete the word "zigzag"

Column 7,
Line 55, delete the word "zigzag"

Column 8,
Line 7, delete the word "zigzag"

UNITED STATES PATENT AND TRADEMARK OFFICE
CERTIFICATE OF CORRECTION

PATENT NO.    : 6,393,818 B1
DATED         : May 28, 2002
INVENTOR(S)   : Takerou Nakagawa et al.

It is certified that error appears in the above-identified patent and that said Letters Patent is hereby corrected as shown below:

<u>Column 8, cont'd.</u>
Line 19, change "Further, when the steel strip used as a workpiece is subjected to drawing in the rolled product manufacturing process, there is no reason to fear that the steel strip will be broken or ruptured, because the dimples are formed in a zigzag pattern" to -- Further when the steel strip used as a workpiece is subjected to drawing in the rolled product manufacturing process, there is no reason to fear that the steel strip will be broken or ruptured, because the dimples are formed in a pattern such that any imaginary straight line extending widthwise along one of the dimpled surfaces extends over a plurality of the dimples. --

Signed and Sealed this

Nineteenth Day of November, 2002

*Attest:*

JAMES E. ROGAN
*Attesting Officer*       *Director of the United States Patent and Trademark Office*

UNITED STATES PATENT AND TRADEMARK OFFICE
CERTIFICATE OF CORRECTION

PATENT NO.      : 6,393,818 B1
DATED           : May 28, 2002
INVENTOR(S)     : Takerou Nakagawa et al.

It is certified that error appears in the above-identified patent and that said Letters Patent is hereby corrected as shown below:

Column 3,
Line 31, change "such that a plurality of recessed portions are defined by the dimples on any imaginary straight line on the dimpled surface or surfaces in the widthwise direction of the steel strip" to -- in a pattern such that any imaginary straight line extending widthwise along one of the dimpled surfaces extends over a plurality of the dimples;
Line 50, delete "[a]";

Column 5,
Line 11, delete "[present]";'
Line 43, delete "The terms 'dimples are arranged zigzag' means that they are positioned zigzag in the transverse direction of the steel strip 3."
Line 48, change "When the steel strip 3 is subjected to drawing, it will never be broken or ruptured, because the dimples 2 are arranged uniformly in a zigzag pattern" to
--When the steel strip 3 is subjected to drawing, it will never be broken or ruptured, because the dimples 2 are arranged uniformly in a pattern such that any imaginary straight line extending widthwise along one of the dimpled surfaces extends over a plurality of the dimples. --

Signed and Sealed this

Fifth Day of August, 2003

JAMES E. ROGAN
*Director of the United States Patent and Trademark Office*